July 9, 1940.  H. R. HOWSER  2,207,616
PROCESS OF MAKING A COMPOSITE FROZEN EDIBLE PRODUCT
Filed Oct. 4, 1939  2 Sheets-Sheet 2
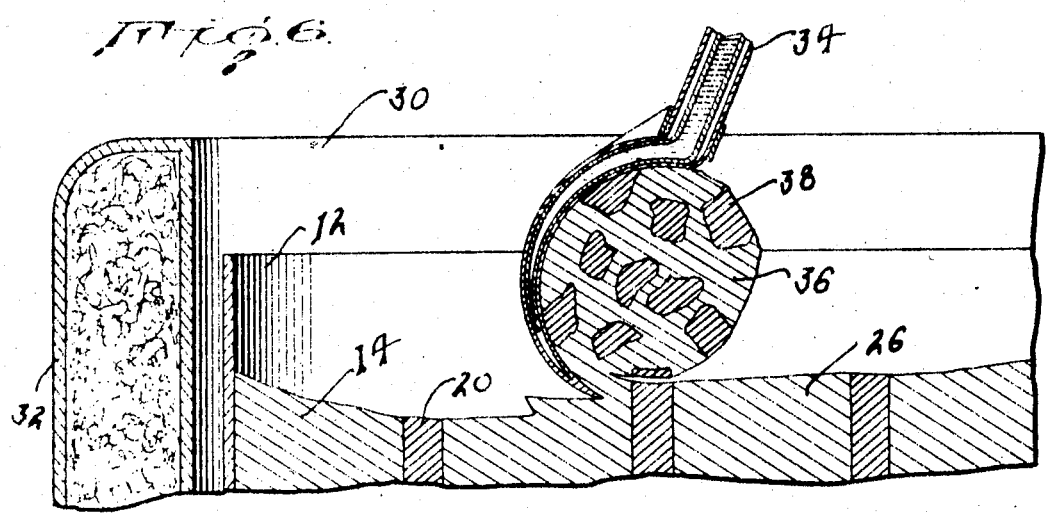
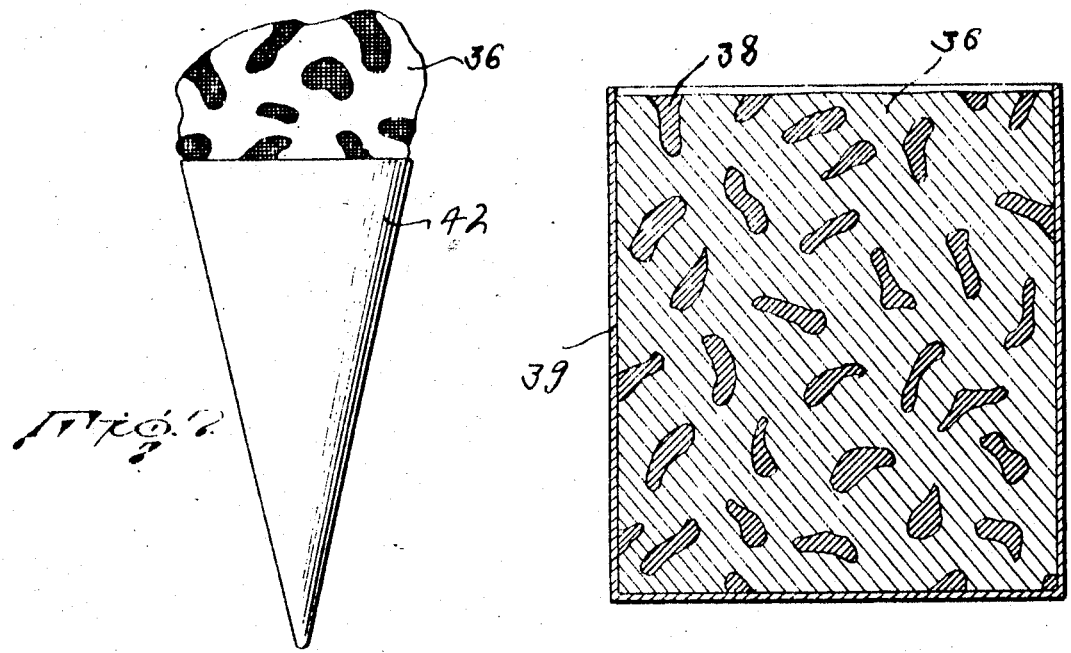
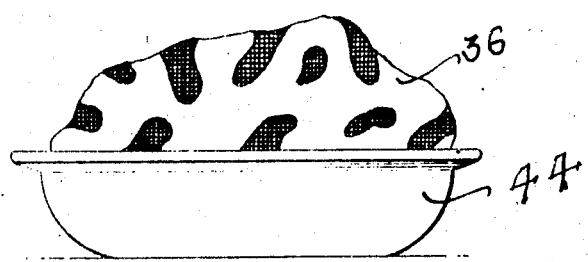
Inventor
Harry R. Howser,
By Lee T. Bowland
Attorney Patented July 9, 1940

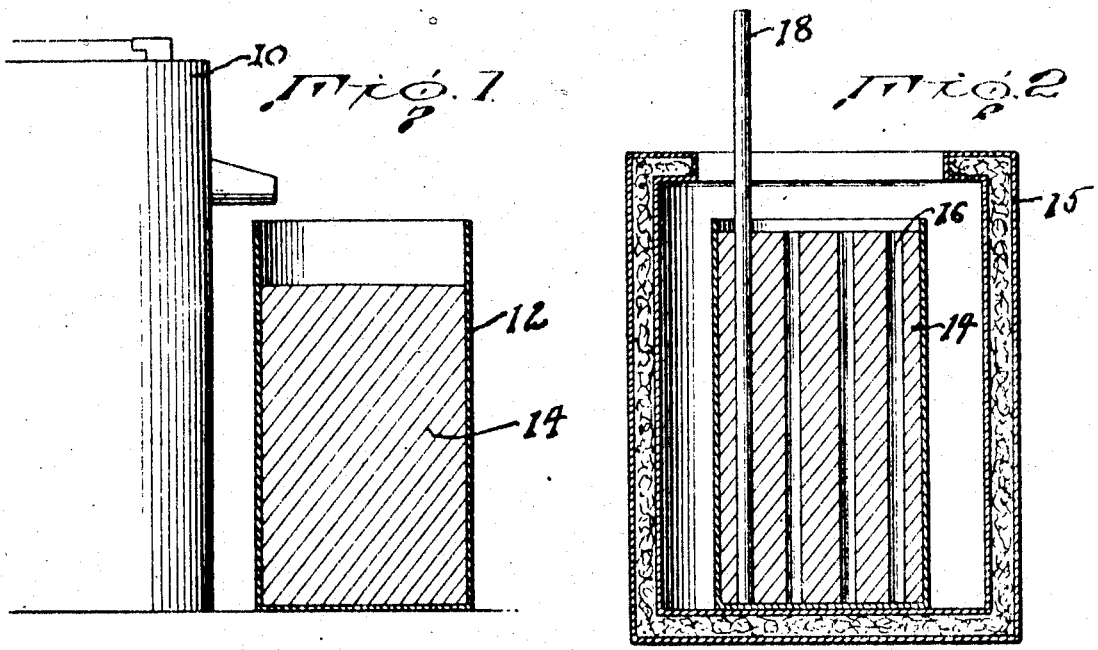
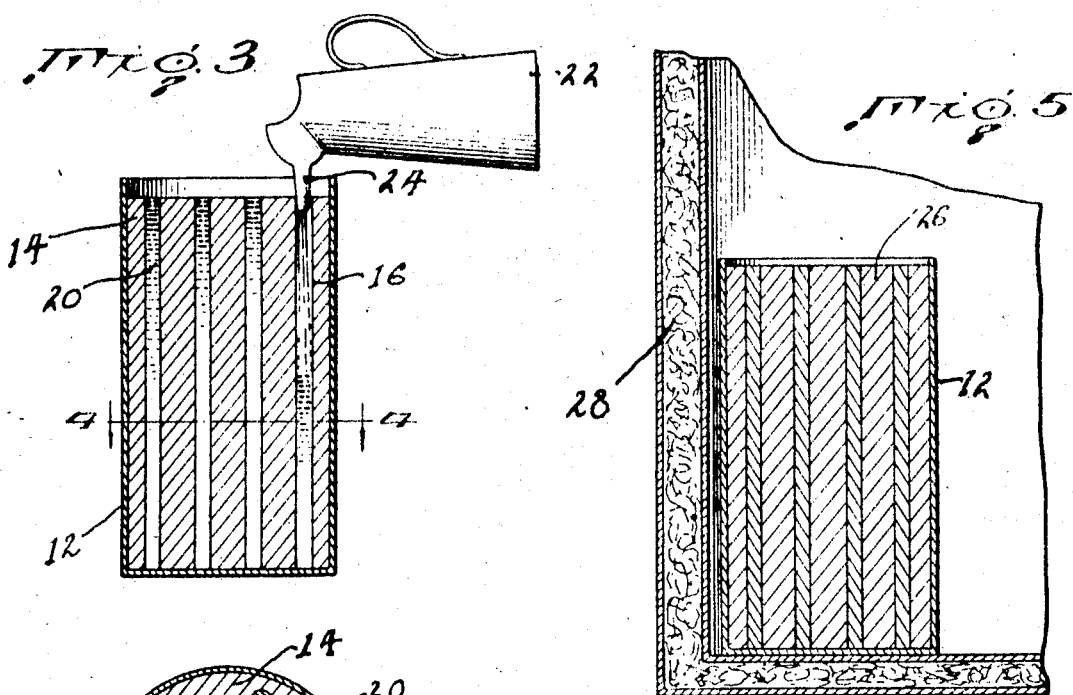
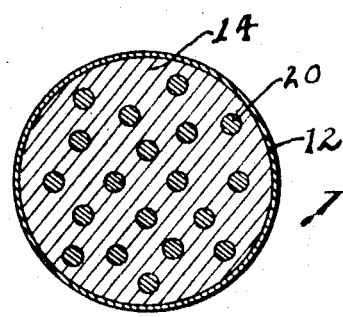

2,207,616

UNITED STATES PATENT OFFICE 2,207,616

PROCESS OF MAKING A COMPOSITE FROZEN EDIBLE PRODUCT

Harry R. Howser, Washington, D. C.

Application October 4, 1939, Serial No. 297,946

8 Claims. (Cl. 107—54)

The present invention relates to the manufacture of an improved composite edible frozen product, and it has particular relation to a bulk or packaged sherbet, ice milk, ice cream, frozen custard, or the like substances having a plastic edible flavoring material of contrasting characteristics dispersed therein in disconnected portions.

One of the most popular forms of eating a combination of such substance and a flavoring material is the conventional ice cream sundae, which is made by pouring a separate liquid flavoring material over an individual serving of sherbet, ice milk, ice cream, frozen custard, or the like.

Another popular form of manufacturing and selling a similar composite product is to insert within an individual serving of such basic substances a solidly frozen core of flavoring material which returns to a liquid state at ice cream serving temperatures, and which, when the body portion is broken, runs out and down over the remainder of the substance forming substantially the conventional sundae.

While the product of the present invention is entirely unlike the conventional sundae, it may, nevertheless, be manufactured and sold in direct competition with and as a substitute for the conventional sundae type of product. The product of the present invention, however, obviates all of the disadvantages of the conventional sundae and provides a product which can be manufactured at a central manufacturing plant, delivered, dispensed, and consumed at places remote therefrom as easily and readily as an individual portion of plain sherbet, ice milk, ice cream, frozen custard, or the like, thereby eliminating the necessity of handling and serving a separate sticky and messy flavoring material at the time the basic substance is being served. Furthermore, the product made in accordance with the process of this invention permits for the first time the dispensing of a sundae type of product in the form of an ice cream cone or a frozen stick confectionery product.

An object of the present invention is the provision of the new, simple and inexpensive process for making a new and improved composite product comprising a basic edible substance, such as sherbet, ice milk, ice cream, frozen custard or the like, having relatively small portions of flavoring material of contrasting characteristics scattered therethrough in disconnected portions in such a manner that a small serving, such as a spoonful of the finished product, cannot be eaten without consuming some of the flavoring material along with the basic substance. In this new product the disconnected portions of the flavoring material, having contrasting characteristics such as taste, color, appearance, texture, density, etc., are relatively small as compared to the total volume of the finished product, but the disconnected portions of flavoring material, per se, are relatively large and of a substantial volume as compared to substances of conventional particle size, such as for example, chopped nuts, candy granules or comminuted farinaceous material.

Another object of the present invention is to provide a new and improved process for the manufacture of a product embodying relatively small amounts of flavoring material in disconnected portions scattered throughout a relatively large amount of basic frozen edible substances in such a way that small portions, such as a spoonful, of the basic substance cannot be consumed without consuming some of the flavoring material with each portion thereof.

Another object of the invention is to provide an efficient, economical and sanitary manner of embodying a contrasting flavoring material uniformly in a frozen edible basic substance to produce a new and novel composite product.

A further object of the invention is to provide a simple and inexpensive method or process for embodying a contrasting edible flavoring material into a combination product of the character described, which will be pleasing, attractive in appearance and appetizing.

Another object of the invention is the provision of a process for making a composite frozen edible product of the character above described, which becomes increasingly attractive in appearance through the final step of scooping or dipping small individual servings thereof from a large bulk container.

A further object of the invention is to provide a simple and inexpensive method for producing a variegated product of the character described having discontinuous sinuous strips of contrasting flavoring material dispersed uniformly therethrough.

Other and further objects of the invention will be apparent from a detail description thereof, wherein only a preferred form of embodiment of the invention is shown and described reference being had to the accompanying drawings, forming a part hereof, in which:

Figure 1 is a fragmentary side elevation view, partly in section, showing the partial filling of a container, such as a conventional five gallon ice cream can, with a semi-frozen or semi-plastic substance from a conventional ice cream freezer;

Figure 2 is a vertical-sectional view of the partially filled container shown in Figure 1, and illustrating the step of forming a series of spaced apertures in the semi-frozen or semi-plastic substance while the same is maintained under refrigerating temperatures;

Figure 3 is a vertical-sectional view of the container shown in Figure 2 illustrating one method of inserting an edible contrasting flavoring material into the apertures formed in the basic edible substance;

Figure 4 is a cross-sectional view of the container shown in Figure 3 the same being taken substantially along the line 4—4 thereof;

Figure 5 is a fragmentary vertical-sectional view of the container shown in Figure 3, illustrating the step of refrigerating the composite mass in a hardening room to harden the basic substance and flavoring material into a composite form-retaining plastic mass;

Figure 6 is a fragmentary vertical-sectional view of the container shown in Figure 5, disposed within a refrigerating chamber in a conventional soda fountain cabinet, and illustrates the step of scooping or dipping an individual composite serving therefrom, which step shows the breaking up of the continuity of the long continuous strip-like portions of contrasting flavoring material into relatively short discontinuous portions and dispersing them in a plurality of directions throughout the final individual serving;

Figure 7 illustrates a final individual serving, such as is produced in Figure 6, being dispensed in a conventional ice cream cone;

Figure 8 is a vertical-sectional view of a container, such as a conventional pint or quart bulk package, filled with the product of my invention; and Figure 9 illustrates the composite product of the present invention being dispensed in a dish in the form of an individual serving similar to the conventional dish used in serving an ice cream sundae.

Referring now to the drawings, there is shown in Figure 1 a conventional ice cream freezer 10 and a container 12 that has been partially filled therefrom with a quantity of semi-frozen or partially frozen ice milk, ice cream, frozen custard or a similar plastic substance 14. After the container 12 has been filled from the freezer 10 with the required amount of the basic substance 14, it is placed under refrigeration in a hardening cabinet or the like 15, which is diagrammatically shown in Figure 2, and, when it becomes sufficiently hard to be somewhat form-retaining, a plurality of spaced openings or apertures 16 are formed longitudinally therein by means of a rod or a pole 18, which has been forced manually therethrough as illustrated in Figure 2. The apertures 16 are now ready to be filled in any conventional manner with a liquid flavoring material 20 of a contrasting color which remains a liquid at normal temperatures and attains the consistency of the bulk basic substance at refrigerating temperatures.

One method of inserting this liquid syrup material 20 into the apertures 16 formed in the basic substance 14 is to pour the same from a container 22, having a nozzle or spout 24, adapted to be inserted in the open top of the aperture 16, as best shown in Figure 3. After all the openings or apertures 16 in the substance 14 of the container 12 are filled with the flavoring syrup 20, which is liquid at normal temperatures and becomes a form retaining plastic that is deformable at refrigerating temperatures, the composite mass 26 is placed in a conventional ice cream hardening room 28, which is shown diagrammatically in Figure 5, where it is allowed to harden until the entire mass becomes solidified and congealed sufficiently to permit transportation from place to place. By the term "form retaining plastic that is deformable" I mean to indicate that the flavoring syrup material is subject to deformation in the same conventional manner as the basic substance, namely, sherbet, ice milk, ice cream, frozen custard and the like at normal serving temperature. This characteristic is essential otherwise the finished composite product could not be dipped or scooped for dispersing purposes from a large container for sale in bulk form.

The container 12 and contents 26 are, upon delivery to a retail dealer, placed in a chamber 30 of a conventional soda fountain cabinet 32, which is shown diagrammatically in Figure 6. The final product is served therefrom in the conventional manner, such as by scooping or dipping with conventional ice cream scoop 34, as shown in Figure 6. It will be noted that the act of dipping or scooping an individual serving 36 from the bulk composite mass 26 in the container 12 causes the flavoring material 20 to be broken up into a plurality of relatively short separate portions 38, which are in turn dispersed in a helter-skelter arrangement throughout said final serving 36. The step of scooping and dipping the individual serving 36 from the composite mass 26 in the container 12 has dispersed the plurality of relatively short separate portions 38 throughout the final product so that short separate ribbon-like portions of flavoring material will extend in sinuous form in all directions throughout and over the exposed outer surfaces of the final product. It will be apparent that the step of scooping or dipping has greatly enhanced the appearance of the final product by further dispersing and rearranging the disconnected portions of the flavoring material therethrough. Hence, the composite product is rendered by such necessary rehandling and packaging more appetizing than theretofore.

As shown in Figure 7, the individual serving or ball 36 which has been removed from the bulk composite mass 26 in the container 12 by means of the ice cream dipper 34 may be dispensed in a conventional ice cream cake cone 42.

The filling and packing of small pint and quart packages 39 with a plurality of these individual portions 36, which are removed from the large bulk mass 26 in the container 12 by the dipping or scooping operation shown best in Figure 6, further disperses the flavoring material throughout the final product. Such a small bulk package 38, which has been filled in this manner, is shown in Figure 8.

Another way of dispensing the individual serving or ball 36 either singly or in multiples is shown in Figure 9, wherein the serving or servings 36 upon removal from the bulk mass 26 in the container 12 by means of the ice cream scoop or dipper 34 is dispensed in an ordinary sundae ice cream serving dish 44.

When reference is made to normal temperatures, it is understood that I means such normal atmospheric temperatures as are found out-of-doors in the summer time, viz between 50° F. and 100° F. When reference is made to refrigerating temperatures, it is to be understood that I am referring primarily to temperatures below 32° F. The term "congealed" as used in this specification is to be understood to define a change in state brought about by a lowering of the temperature as for example, water becomes ice at 32° F., changing from a liquid to a solid state.

The term "consistency" as used herein in connection with the flavoring material indicates that such material remains at substantially the same degree of plasticity as the basic substance at corresponding temperatures, and that it is of a character such that it will not commingle with the basic substance at corresponding refrigerating temperatures, remaining separate and distinct and maintaining clear lines of demarcation between the basic substance and the flavoring material at all such temperatures. The firmness and density may vary, but the same "consistency" is maintained at refrigerating temperatures so that the contrast between the flavoring material and basic substance is always sharp and distinct.

This application is a continuation in part of my application, Serial Number 233,819, filed October 7, 1938, wherein the product is claimed.

Although I have only described in detail one embodiment of the invention, it will be apparent to those skilled in the art that the invention is not so limited, but that various modifications may be made therein without departing from the spirit thereof or from the scope of the appended claims.

I claim:

1. The method of manufacturing a variegated bulk product which comprises the steps of inserting over substantially the entire cross-sectional area of a confined mass of a partially frozen basic substance a plurality of spaced strips of flavoring syrup material of contrasting characteristics, and then breaking up the composite mass in such a manner as to cause said strips of flavoring syrup material to be broken up into a plurality of relatively short separate portions which are dispersed in a plurality of directions throughout said final product, said separate portions being of a substantial volume as compared to particle size.

2. The method of manufacturing a variegated bulk product which comprises the steps of inserting uniformly over substantially the entire cross-sectional area of a confined mass of a partially frozen basic substance a plurality of spaced parallel strips of flavoring syrup material of contrasting characteristics, and then breaking up the composite mass in such a manner as to cause said strips of flavoring syrup material to be broken up into a plurality of relatively short separate portions which are dispersed in a plurality of directions throughout said final product, said separate portions being of a substantial volume as compared to particle size.

3. The method of manufacturing a variegated bulk product which comprises the steps of injecting in spaced relation throughout substantially the entire cross-sectional area of a confined mass of a partially frozen basic substance a plurality of relative long thin strips of a flavoring syrup material of contrasting characteristics, and then breaking up the composite mass in such a manner as to cause each of said strips of flavoring syrup material to be broken up into a plurality of relatively short sinuous portions which are dispersed in a plurality of directions throughout said final product, said sinuous portions being of a substantial volume as compared to particle size.

4. The method of manufacturing a variegated bulk product which comprises the steps of forming a plurality of spaced apertures over substantially the entire cross-sectional area of a confined mass of a partially frozen edible basic substance, filling said apertures with a contrasting flavoring syrup material, and then breaking up said composite mass in such a manner as to cause said flavoring syrup material to be broken up into a plurality of relatively short separate portions which are dispersed in a plurality of directions throughout said final product, said separate portions being of a substantial volume as compared to particle size.

5. The method of manufacturing a variegated bulk product which comprises the steps of forming over substantially the entire cross-sectional area of a confined mass of a partially frozen edible basic substance of tubular shape a plurality of openings, filling said openings immediately with a flavoring syrup material of contrasting characteristics to said basic substance to form spaced continuous strips of flavoring syrup material throughout said basic substance, and then breaking up said composite mass in such a manner as to cause said continuous strips of flavoring syrup material to be broken up and dispersed in a plurality of relatively short separate portions which extend in a plurality of directions throughout said final product, said separate portions being of a substantial volume as compared to particle size.

6. The method of manufacturing a variegated bulk product which comprises the steps of forming uniformly over substantially the entire cross-sectional area of a confined mass of a partially frozen edible basic substance of tubular shape a plurality of spaced parallel openings, filling said openings immediately with a flavoring syrup material of contrasting characteristics to said basic substance to form spaced continuous strips of flavoring syrup material throughout said basic substance, and then breaking up said composite mass in such a manner as to cause said continuous strips of flavoring syrup material to be broken up and dispersed in a plurality of relatively short disconnected portions which extend in a plurality of directions throughout said final product, said disconnected portions being of a substantial volume as compared to particle size.

7. The method of manufacturing a variegated bulk product which comprises the steps of forming over substantially the entire cross-sectional area of a confined mass of a partially frozen edible basic substance of tubular shape a plurality of transversely spaced longitudinally extending openings, filling said openings immediately with a flavoring syrup material of contrasting characteristics to said basic substance to form spaced longitudinally extending continuous strips of flavoring syrup material throughout said basic substance, and then breaking up said composite mass in such a manner as to cause said continuous strips of flavoring syrup material to be broken up and dispersed into a plurality of relatively short separate portions which extend in a plurality of directions non-uniformly throughout said final product, said separate portions being of a substantial volume as compared to particle size.

8. The method of manufacturing a variegated bulk product which comprises the steps of inserting over substantially the entire cross-sectional area of a confined mass of a partially frozen basic substance a plurality of spaced continuous strips of flavoring syrup material of contrasting characteristics, and then scooping small individual servings from said composite mass to break up the same in such a manner as to cause said strips of flavoring syrup material to be broken up into a plurality of relatively short separate portions which are dispersed in a plurality of directions throughout said serving, said separate portions in said serving being of a substantial volume as compared to particle size.

HARRY R. HOWSER.